March 4, 1952   A. SULGER   2,587,923
DRILLING DEVICE
Filed Dec. 9, 1946   2 SHEETS—SHEET 1
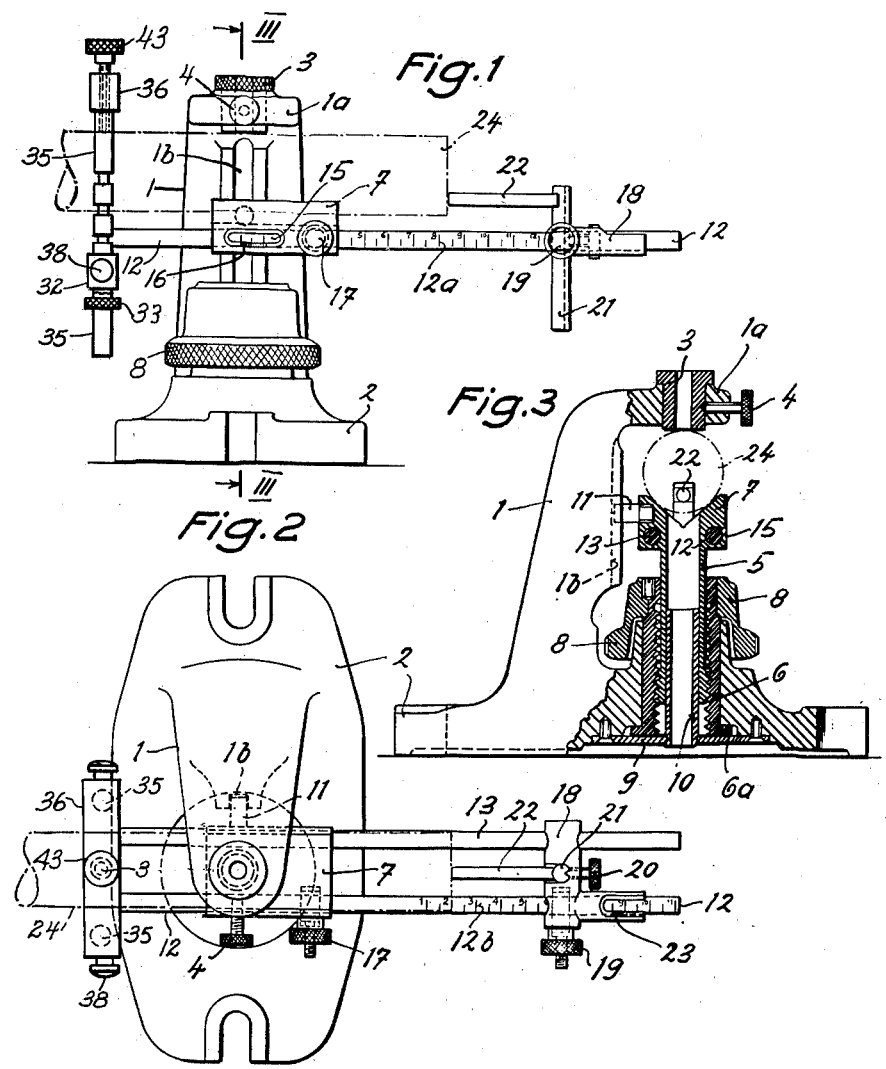
Inventor:
Adolf Sulger
By H. E. Rowen March 4, 1952     A. SULGER     2,587,923
DRILLING DEVICE
Filed Dec. 9, 1946     2 SHEETS—SHEET 2
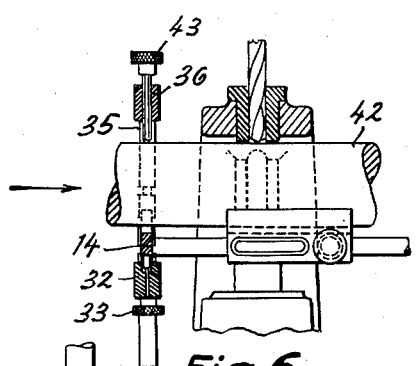
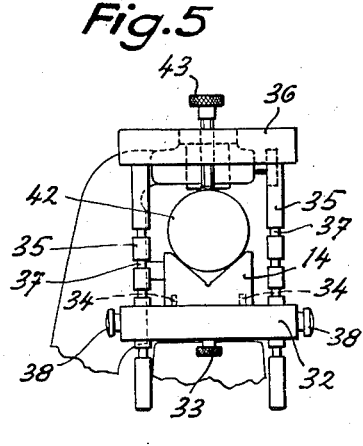
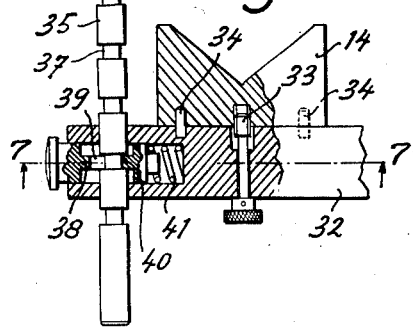
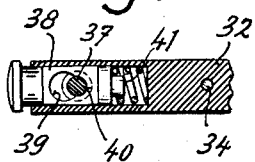
Inventor:
Adolf Sulger
By L. E. Rowen Patented Mar. 4, 1952

2,587,923

UNITED STATES PATENT OFFICE 2,587,923

DRILLING DEVICE

Adolf Sulger, Kilchberg, Switzerland

Application December 9, 1946, Serial No. 714,975
In Switzerland December 15, 1945

3 Claims. (Cl. 77—62)

1

The present invention relates to a drilling appliance utilized for producing radial bores in stock, preferably round stock, of the type in which the stock is fixed in centered position between a vertically adjustable supporting table and a head receiving an exchangeable drill bush.

The invention more specifically relates to such a drilling appliance in which the vertically adjustable table is confined for movement in alignment with the axis of the drill bush and is further provided with parallel bars slidably mounted therein for movement transverse to the axis of the drill bush.

While drilling appliances or jigs are well known in the art, it has long been a problem in such an appliance in which the work cannot only be centered in direct relation between the drill bush and vertically adjustable table but adequate provision has heretofore not been made for accommodating work pieces of various diameter and also providing in such an assembly means for fixing the work piece in relation to its position on the table when a transverse bore has been drilled therethrough so that upon subsequent displacement of the work piece transverse to the axis of the drill bush the work piece can be maintained in this fixed relationship, whereupon a series of longitudinally aligned radial bores can be provided in the work piece.

It is consequently an object of the present invention to provide in a drilling appliance of the type described including the vertically adjustable table a clamping means carried by the parallel bars and thereby displaceable transversely of the axis of the drill bush and which clamping means are adjustable to accommodate work pieces of different diameter and operative to fix the position of the work piece relative to the adjustable table so that a plurality of longitudinally aligned radial bores can be drilled through the work piece.

It is a specific object to provide in a drilling jig of the character described a pair of parallel bars carried by the vertically movable table and connected for simultaneous movement transverse to and along opposite sides of the drilling axis, a pair of horizontally vertically spaced cross pieces forming therebetween clamp means for a horizontally disposed work piece and connected together to constitute a clamp frame connected to the bars and in which the connecting means of the frame constitute a pair of vertically disposed supports connected to one of the cross pieces and axially displaceable relative to the other, and in which the frame further includes retain-

2 ing means associated with said other cross piece to retain the displaced supports in different adjusted positions.

It is still a more specific object to provide in a drilling jig of the character described, resilient retaining means mounted in bores at opposite ends of the cross piece connected to the bars and normally operative to fix the supports in an adjusted position but releasable to permit movement of the vertical supports to different positions.

It is a still more specific object to provide a work piece bearing member immovably associated with the bars, and to which the cross piece embodying the retaining means is connectable in immovable relationship, and in which a vertically adjustable clamping element is carried by the said other cross piece and engageable with a supported work piece to clamp the same against the bearing member.

Further and more specific objects will be apparent from the following specification taken in connection with the accompanying drawings, in which:

Figure 1 illustrates the drilling appliance in front elevation with one of the vertically adjustable clamps of the clamping frame broken away, Figure 2 is a top plan view of the arrangement of Figure 1, Figure 3 is a partial sectional view taken along line 3—3 of Figure 1, Figure 4 is a partial front elevation of the drilling appliance illustrating the drill bush and clamp frame partly in section, Figure 5 is an elevational view taken in the direction of the arrow of Figure 4, Figure 6 is a view on an enlarged scale partly in section of the portion of the structure illustrated in Figure 5, and Figure 7 is a sectional view taken along line 7—7 of Figure 6.

In the example illustrated 1 is a standard having a foot 2 and made, for instance, of cast iron. The standard 1 terminates at the top in a horizontally projecting limb or bracket 1a, in which a boring bush or drill guide 3 is mounted so as to be capable of being exchanged and of being fixed in position by means of a screw 4. Coaxial with the boring bush 3 is a spindle 5 which runs in a threaded nut 6 and supports at its upper end a prismatic bearing 7, the centre plane of which coincides with the longitudinal axis of the boring bush 3. At the upper end of the threaded nut 6 is fixed for actuating it a nurled handwheel or operating member 8. The threaded nut 6 is supported in the standard 1 so as to be capable of rotating therein and is secured against axial displacement by a flange 6a, of which one side bears against the standard 1 and the other side against a bottom plate 9 screwed to the latter. In the middle of the bottom plate 9 is fixed a sleeve 10 which protects the thread of the spindle 5 from damage due to the entry of drilling particles thereinto. A pin 11 is fixed in the prismatic bearing 7 and its free end engages in a vertical groove 1b of the standard, thereby securing the spindle 5 and the prismatic bearing 7 against turning about the spindle axis.

In the prismatic bearing 7 constituting a vertically adjustable table, two horizontally disposed bars 12 and 13 are supported, so as to be axially displaceable therein. The two bars extend parallel to the centre plane of the prismatic bearing and are rigidly connected to one another at one end by a transverse bearing member 14. This transverse member has the same profile as the prismatic bearing 7.

On its front side the front bar 12 is provided with a graduated scale 12a. On the front side of the prismatic bearing there is a window 15, through which the scale 12a can be observed. At the lower edge of the window is a reading off mark 16 with a vernier. By means of a clamping screw 17 the bar 12 can be clamped in any desired position.

A slide 18 is slidably mounted on the two bars 12, 13 and adapted to be clamped in any position by means of a clamping screw 19. In this slide is supported a detent pin 21 which is capable of vertical displacement and of being fixed in any position by a screw 20 and which is provided at its upper end with a horizontal arm 22. On the upper side of the bar 12 is a graduated scale 12b which coacts with a reading off mark with vernier 23 marked off on the slide 18.

In Figs. 1 to 3 the work to be drilled, shown in dot and dash lines, has the form of a smooth cylindrical pin 24. When in this pin a radial hole is to be drilled, for instance at a distance of 8.5 cm. from the right-hand end face, the slide 18 is moved into that position, in which the reading-off mark 23 of the scale 12b stands at the number 8.5 (Fig. 2). The pin 24 is thereupon placed in the prismatic bearing 7 and is pushed to the right (in Figs. 1 and 2), until the right-hand end face of the pin bears against the arm 22 of the detent pin 21. In this position the right-hand end face of the pin 24 is exactly at a distance of 8.5 cm. from the centre axis of the boring bush 3. Thereupon, the spindle 5 together with the prismatic bearing 7 is raised by turning the hand wheel 8 in one direction, until the pin 24 is under pressure between the boring bush 3 and the prismatic bearing 7. The hole to be made can then be drilled so as to be accurately radial.

As indicated in Figure 1, the clamping frame described in detail hereinafter is connected to the transverse bearing member 14 and supports the work piece at a point transversely displaced with respect to the drilling axis and due to its adjustability can accommodate and fully support work pieces of different diameters As illustrated more in detail in Figures 4 to 7, a transverse bar or cross piece 32 constitutes a portion of a clamping frame which by means of a screw 33 can be tightened against the transverse bearing member 14. By means of two fitting pegs 34 the transverse bar 32 is held accurately parallel to the transverse member 14. The parts 35 constitute two vertical supports which are held together at the top by another cross piece 36 and are axially displaceable in two bores of the transverse bar 32. Both supports 35 have a series of spaced recesses 37 cut in them by turning, which constitute axially spaced reduced portions and functions as rests. In each end of the transverse bar 32 and there is provided an inwardly extending bore within each of which is disposed a plunger or sliding member 38 which is provided with a bore 39 corresponding to the diameter of the supports 35. At one side the bore is continued as a slot 40, the width of which corresponds to the diameter of the supports at the recesses 37. The bore 39 and the slot 40 together form a stepped elongated hole or keyhole shaped aperture. At the place, where the support 35 passes through the sliding member 38 the latter has a thickness corresponding to the width of the recesses 37. A compression spring 41 urges each sliding member 38 to the position shown in Figs. 6 and 7, in which one of the recesses 37 rests in the slot 40. In this position the supports 35 are secured by the sliding members 38 against axial displacement. On the sliding members being forced inwards, that is, towards one another, the larger bores 39 will come into a position, in which they are coaxial with the enlarged portions of the supports 35, thus enabling the latter to be displaced axially.

It is therefore clear that the plungers 38 in conjunction with the springs 41 constitute resiliently operable retaining means functioning to retain the vertically disposed supports 35 in adjusted position and thereby providing for an adjustable clamping frame.

When a cylindrical body 42, Figs. 4 and 5 is to be provided with a row of radial bores lying in the same plane, the work is clamped in the clamping device 32 to 41, as shown in these figures. The cross piece 36 receives a screw 43 constituting a vertically adjustable clamping element engageable with the work piece so that the work 42 can be pressed against the transverse bearing member 14 and thus held firmly by friction or secured against turning about the axis of rotation. After the first bore hole has been completed and after easing the handwheel 8, the work together with the clamping device and the bars 12, 13 is displaced by the distance between the holes, whereupon a further hole can be bored, which lies in the same longitudinal plane of the work as that previously drilled and so on.

Accordingly it will be seen that the two lateral supports 35, together with the cross pieces 32 and 36 form a frame, of which the yoke 36 and transverse structures 32—14 form opposing clamp jaws for the workpiece.

According to the diameter of the hole to be drilled the boring bush can be exchanged for a suitable bush. In the example illustrated the boring bush is inserted from above into the bracket 1a of the standard 1. Instead of this, it is, of course, also possible to insert the boring bush from below, so that the bush, on the handwheel 8 being tightened, will be pressed with its collar against the bracket 1a. It is also of advantage, to provide the handwheel with some radial bores. Into these bores a tommy bar can be inserted, by means of which the handwheel may be turned. This arrangement is of special advantage, when operating on a considerable number of similar pieces of work, where, both when clamping and releasing the work, the handwheel has to be turned through only a few angular degrees.

What I claim is:

1. In a drilling jig of the character described, the improvement comprising: a pair of parallel bars mounted for simultaneous movement transverse to and along opposite sides of the drilling axis; a pair of horizontally disposed cross pieces vertically spaced apart so as to form therebetween a clamp for a horizontally disposed workpiece, one of said cross pieces having vertical apertures through its opposite ends and being connected to said bars; a pair of vertically disposed supports connected to the other of said cross pieces and jointly axially displaceable through the said apertures in said other cross piece, said supports being provided with axially spaced rests; and horizontally movable retaining means associated with said apertured crosspiece for engaging successive rests of the vertical supports so as to accommodate workpieces of different thickness within said clamp.

2. A drilling jig as defined in and by claim 1 wherein the rests on said vertical supports comprise axially spaced reduced portions, and wherein said apertured cross piece is provided with bores extending inwardly from the opposite ends thereof and wherein said retaining means includes a plunger disposed within each bore, resilient means normally urging said plunger outwardly with respect to the bores and each plunger having a key-hole shaped aperture therein, the smaller portion of the apertures being engageable with the reduced portion on the supports to retain the supports and thereby the other cross piece in adjusted position, inward movement of the plungers aligning the enlarged portion of the keyhole aperture with the supports so that the same are vertically displaceable therethrough.

3. A drilling jig as defined in and by claim 2 in which a work-piece bearing member is immovably associated with said first mentioned apertured cross piece and in which a vertically adjustable clamping element is carried by said other cross piece and engageable with a supported work-piece to clamp the same against said bearing member.

ADOLF SULGER.

REFERENCES CITED

The following references are of record in the file of this patent:

UNITED STATES PATENTS

| Number | Name | Date |
|---|---|---|
| 810,319 | Blazej | Jan. 16, 1906 |
| 1,119,470 | Swantusch | Dec. 1, 1914 |
| 1,616,039 | Gossage | Feb. 1, 1927 |
| 2,157,789 | Hudgens et al. | May 9, 1939 |
| 2,349,142 | Christenson | May 16, 1944 |
| 2,373,379 | Brown | Apr. 10, 1945 |
| 2,416,010 | Klosz | Feb. 18, 1947 |

FOREIGN PATENTS

| Number | Country | Date |
|---|---|---|
| 135,877 | Great Britain | Dec. 11, 1919 |
| 551,448 | Great Britain | Feb. 23, 1943 |

OTHER REFERENCES

American Machinist, page 309, Aug. 24, 1922.